(12) United States Patent
Laakso

(10) Patent No.: US 6,671,512 B2
(45) Date of Patent: Dec. 30, 2003

(54) METHOD FOR TRAFFIC LOAD CONTROL IN A TELECOMMUNICATION NETWORK

(75) Inventor: Janne Laakso, Helsinki (FI)

(73) Assignee: Nokia Corporation, Espoo (FI)

( * ) Notice: Subject to any disclaimer, the term of this patent is extended or adjusted under 35 U.S.C. 154(b) by 385 days.

(21) Appl. No.: 09/860,190

(22) Filed: May 17, 2001

(65) Prior Publication Data

US 2003/0003921 A1 Jan. 2, 2003

Related U.S. Application Data

(63) Continuation of application No. PCT/EP98/08321, filed on Dec. 18, 1998.

(51) Int. Cl.$^7$ ................................................ H04Q 7/20
(52) U.S. Cl. .................... 455/453; 455/450; 455/452.1; 455/522
(58) Field of Search ................................ 455/453, 450, 455/451, 452.1, 452.2, 464, 403, 405, 411, 422.1, 522, 456.1, 509

(56) References Cited

U.S. PATENT DOCUMENTS

| | | | |
|---|---|---|---|
| 4,435,840 A | | 3/1984 | Kojima et al. |
| 5,245,629 A | * | 9/1993 | Hall ............................ 455/522 |
| 5,839,056 A | * | 11/1998 | Hakkinen ..................... 455/69 |
| 6,266,531 B1 | * | 7/2001 | Zadeh et al. ................. 455/453 |
| 6,317,600 B1 | * | 11/2001 | Salonaho et al. ............ 455/453 |
| 6,469,993 B1 | * | 10/2002 | Seo et al. .................... 370/329 |
| 6,594,495 B2 | * | 7/2003 | Salonaho et al. ............ 455/453 |

FOREIGN PATENT DOCUMENTS

| | | |
|---|---|---|
| EP | 0856955 A2 | 8/1998 |
| WO | WO 97/08847 | 3/1997 |
| WO | WO 97/08909 | 3/1997 |
| WO | WO 98/24199 | 6/1998 |

OTHER PUBLICATIONS

International Search Report for PCT/EP98/08321.

* cited by examiner

Primary Examiner—Edward F. Urban
Assistant Examiner—Sonny Trinh
(74) Attorney, Agent, or Firm—Squire, Sanders & Dempsey L.L.P.

(57) ABSTRACT

The present invention proposes a method for traffic load control in a telecommunication network consisting of at least one radio terminal (MS) and at least one radio transceiver device (BS), each radio transceiver device (BS) defining a cell of said network being controlled by a network control device (RNC); comprising the steps of: setting a first reference load value for the load of a respective cell; monitoring the load of said respective cell, and in response to the load exceeding the first reference load value, manipulating the power control to decrease the transmission power levels in the cell. The present invention thus proposes a fast load control method in that during a situation in which a certain reference load value is exceeded, the load is controlled per base station sector by affecting, e.g. transmit power commands. In addition, such load reductions can be supplemented by re-negotiating bit rates, for example. With the proposed method a necessary load margin can be reduced which advantageously increases the system capacity.

10 Claims, 5 Drawing Sheets

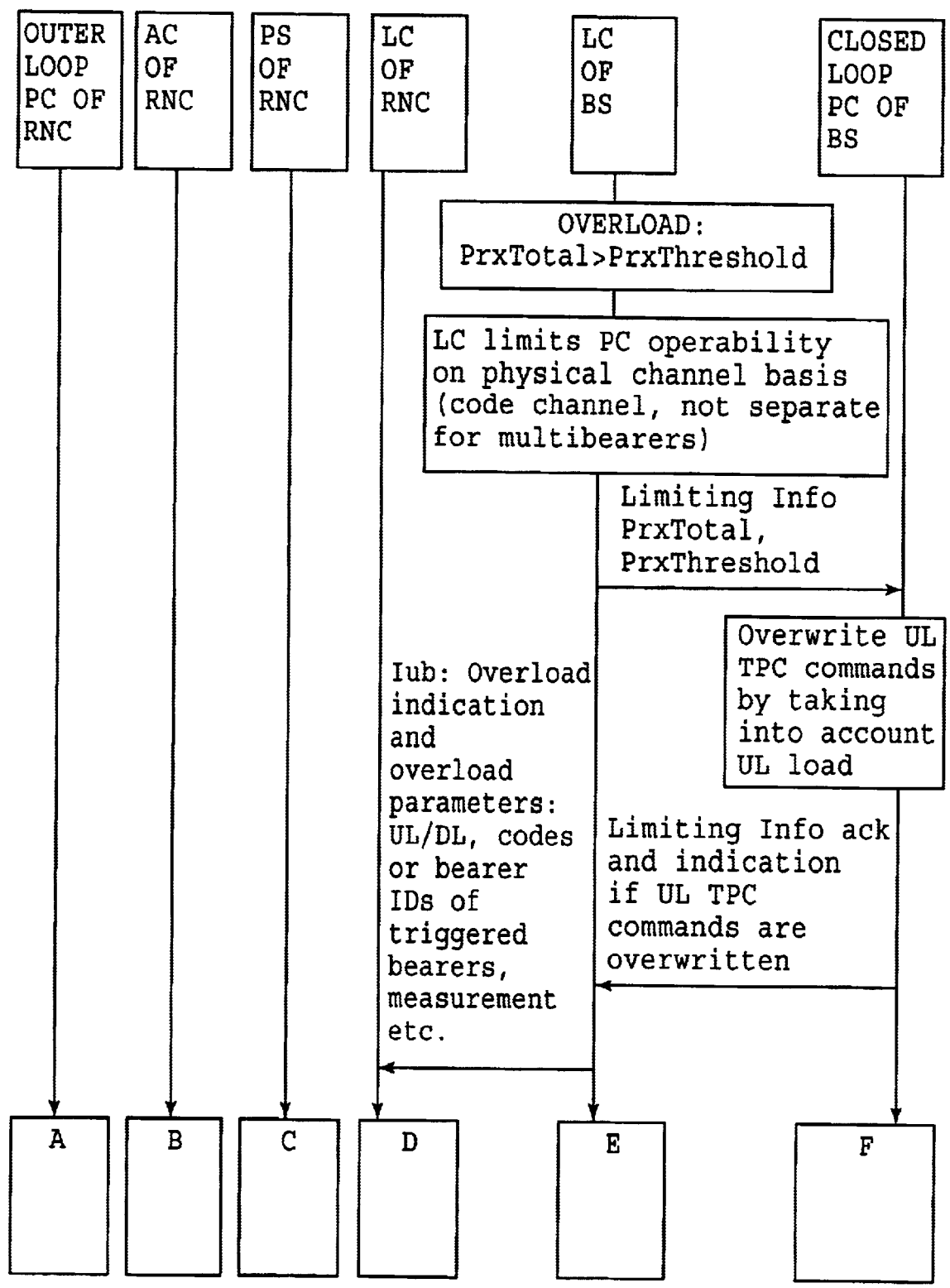

METHOD FOR TRAFFIC LOAD CONTROL IN A TELECOMMUNICATION NETWORK

This is a continuation of Application No. PET/EP98/08321 filed Dec. 18, 1998.

FIELD OF THE INVENTION

The present invention relates to a method for traffic load control in a telecommunication network consisting of at least one radio terminal and at least one radio transceiver device, each radio transceiver device defining a cell of the network being controlled by a network control device.

BACKGROUND OF THE INVENTION

Recently, telecommunication networks have widely spread and an increasing number of subscribers uses the benefits of telecommunication, in particular radio telecommunication networks.

Such networks consist of a plurality of radio transceiver devices or base stations BS, respectively, which effect transmission between the base stations BS and radio terminals (mobile stations) MS of the individual subscribers. The plurality of base stations BS is controlled by a network control element such as for example a radio network controller RNC.

Within a telecommunication network, not only speech is transmitted, but also other data can be exchanged, such as for example facsimiles, data transmitted by short message services SMS, data polled from the internet and so on. Those data are often referred to as packet data, since they are transmitted in respective data packets or files, respectively.

Thus, the more subscribers are registered to such a network and the more data, speech data and/or packet data, can be transmitted using radio telecommunication networks, the higher will be the traffic load imposed on such systems.

However, the maximum traffic capacity that can be handled by radio telecommunication network is limited by the available radio resources RR such as available frequencies, and/or channelization codes, etc.

If the traffic load is continuously increasing, a point might be reached at which the system is overloaded. Then, for example, no new communication may be established.

Additionally, data transmission via already established communication links will be adversely effected due to interference phenomena, which causes a drawback for respective users in that they can not communicate in good quality. It is even possible that as a worst case scenario an overloaded network may "collapse" and all ongoing communication links will break off.

SUMMARY OF THE INVENTION

Hence, it is an object of the present invention to provide a method for traffic load control in a telecommunication network consisting of at least one radio terminal and at least one radio transceiver device, each radio transceiver device defining a cell of the network being controlled by a network control device, by means of which the above mentioned drawbacks can safely be prevented.

Accordingly, in order to achieve the above object, the present invention provides a method for traffic load control in a telecommunication network consisting of at least one radio terminal and at least one radio transceiver device, each radio transceiver device defining a cell of said network being controlled by a network control device; comprising the steps of setting a first reference load value for the load of a respective cell; monitoring the load of said respective cell, and in response to the load exceeding the first reference load value, manipulating the power control to decrease the transmission power levels in the cell.

Thus, due to the load reference value being defined, a first (fast) load control method can be activated when the first reference load value is exceeded. According to advantageous refinements, a second (slower) load control method can additionally be activated when i) the first reference load value is exceeded (simultaneous activation), ii) when a subsequent monitoring yields that the first (fast) load control did not reduce the traffic load below said reference value, or iii) when even with the first (fast) load control being activated the traffic load also exceeds a second reference load value. The second reference load value can be equal to or higher than the first reference load value.

In particular, the present invention describes a method of a fast (first) load control method, in that during an overload situation (load above a certain reference load value) the load is controlled or reduced, respectively, temporarily and per base station BS by affecting or manipulating power control commands (neglecting TPC commands in downlink, overwriting TPC commands in uplink).

In addition, as already mentioned, the above fast ("immediate") load reduction is supplemented by a "slow" (second) load control method in that the transmission bit rates are affected to correct the overload situation in a more permanent manner, if the first load control method turned out to be not sufficient, or in that connections are being removed from the cell.

Favorable refinements of the present invention are as defined in the dependent claims.

Thus, the present invention provides a novel method for load control which is easy to implement in existing products an which prevents the above described drawbacks.

In particular, the present invention presents a simple load control method to be implemented into existing systems and/or devices, while different measures that can be initiated are harmonized with each other to present one simple method for traffic load control. The present invention provides a fast load control, i.e. first stage load control, respectively, and handled by a respective base station BS in a sector defined by the base station, which aims to temporary reduction of traffic load by denying download DL transmit power TPC commands and overwriting uplink UL transmit power TPC commands (or by reducing a target value for the energy per bit to noise power density ratio (Eb/N0) in the base station during overload) if overload is encountered. If this is still not sufficient to reduce the network traffic load, a second stage load control handled by a radio network controlling device of the network RNC will trigger other actions in order to reduce system load more permanently, for example by reducing bit rates. Thus, decentralized and centralized load control actions are advantageously combined in the proposed method.

Moreover, the proposed load control method can keep the system, i.e. the telecommunication network stable and throttle back the overall load in a controlled fashion.

Additionally, due to the fast first stage load control method, a load margin as the difference between an acceptable (target) load level and a maximum tolerable load level (threshold) can be reduced which increases the network system capacity and thus represents an advantage for the network operator. Target and threshold level could even be set to be identical.

BRIEF DESCRIPTION OF THE DRAWINGS

In the following, the present invention will be described with reference to the drawings, in which.

DETAILED DESCRIPTION OF EMBODIMENTS OF THE INVENTION

The present invention is now described in detail with reference to the drawings.

A) General Telecommunication Network Architecture

Figure 1:
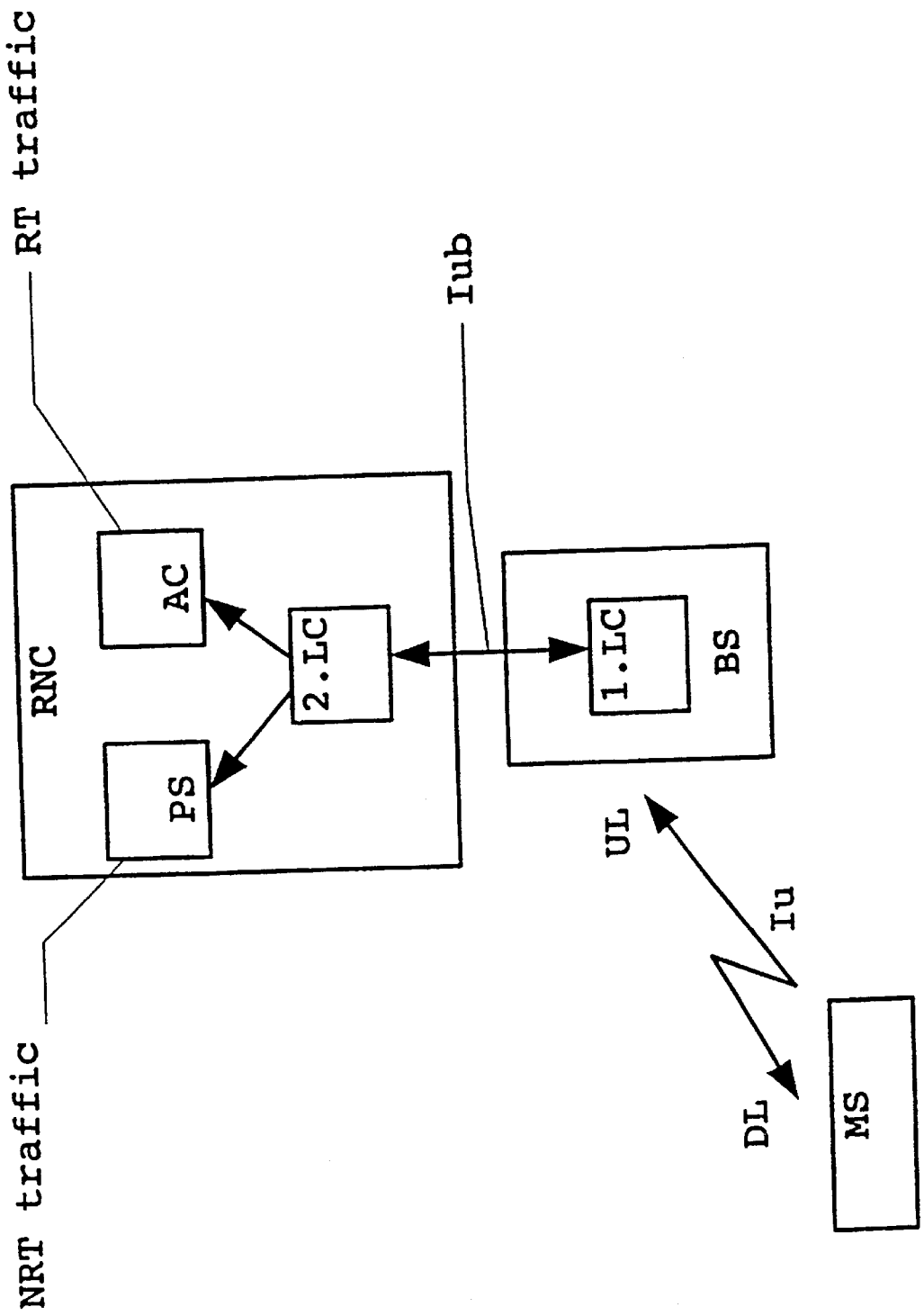
FIG. 1 shows a schematic and simplified block diagram of a telecommunication network.

FIG. 1 of the drawings shows a schematic and simplified block diagram of a radio telecommunication network as an example of a telecommunication network to which the present invention can be applied. The network is not limited to specific type of network in order that the present invention may be applicable. Nevertheless, the following description assumes for explanatory purposes a third generation network, which is for example operated according to the principles of code divisional multiple access CDMA.

As depicted in FIG. 1, a subscriber terminal or mobile station MS communicates via an air interface or radio interface Iu, respectively, with one of a plurality of base stations BS as radio transceiver devices constituting the network. For illustrative purposes, only one mobile station MS and only one base station BS are illustrated, while actually, in a telecommunication network, a plurality of mobile and base stations are simultaneously present and in operation. The communication from the mobile station to the base station is referred to as uplink transmission UL, while the communication from the base station to the mobile station is referred to as downlink transmission DL.

Each respective base station BS as a radio transceiver device is provided with a load control means LC, which is adapted to carry out a first stage "1.LC" of the load control method.

Furthermore, the plurality of respective base stations are controlled by a radio network controller RNC as a network control device. The radio network controller RNC and respective base stations exchange data (control data) via an interface Iub there between. In particular, as shown, the load control means LC of the base station and a load control means LC at the radio network controller RNC side exchange data via this interface.

The control means at the radio network controller side is adapted to carry out a second stage "2.LC" of the load control method.

While the first stage of the load control method mainly influences transmission power in uplink and/or downlink, the second stage of the load control method mainly influences the transmission capacity, for example, in terms of transmitted bit rates.

To this end, the load control means LC of the radio controller device controls a packet scheduling means PS and an admission control means AC of the radio network controller RNC.

The packet scheduling means PS is adapted to schedule the transmission of data packets, which represents a non-real time traffic component within the network since the data packets can be transmitted at selectable times at which transmission capacity is available in the network. Transmission of such data packets in non-real time NRT is also referred to as controllable user traffic, in contrast to non-controllable user traffic.

Non-controllable user traffic in turn means real time RT traffic caused by real time users like for example phone calls which are initiated by users at arbitrary chosen times that can not be controlled by the network controller. Such real time traffic is handled and/or administrated by the admission control means AC of the radio network controller RNC.

The admission control means AC as well as the packet scheduling means PS, although not shown in FIG. 1, also access the Iub interface for data transmission to respective base stations.

In the above briefly described telecommunication network, traffic load is periodically monitored by monitoring a load indication parameter. The monitoring period is shortened in case the monitored load exceeds a reference load value. In the following examples described, the load indication parameter is mainly related to the power, i.e. in uplink UL, total interference power serves as load indication parameter, while in downlink DL, total transmission power serves as load indication parameter. Nevertheless, other parameters of a network system are conceivable as load indication parameters. The respective total interference power and total transmission power are determined and evaluated on a per sector basis. This means, for example for each sector as defined for example by a respective cell of the network, with the cell mainly corresponding to the coverage area of a respective base station.

B) Definition of Parameters Used for Load Control

For still better understanding of the subsequent explanations of the proposed load control method, in the following an overview is given of load related input and output parameters used in connection with the proposed method. The table lists in the left column the parameter name and in the right column the respective meaning thereof.

TABLE

OVERVIEW OF USED LOAD CONTROL PARAMETERS

| PARAMETER NAME | MEANING/DEFINITION |
| --- | --- |
| PrxTotal | Total received power in UL, measured on cell basis (100 ms–500 ms) measured total received wideband interference power in the cell Source: BS Interface: BS -> MS, layer 3 (L3) radio resource (RR)/system information on BCCH; BS -> RNC/2.LC, L3 RR indication; RNC/2.LC -> PS; RNC/2.LC -> AC related functions: admission control, load control, packet scheduling |
| PrxNoise | uplink noise level in BS digital receiver radio network configuration parameter noise level in the BS digital receiver when there is no load (thermal noise + noise figure) Source: RNC/2.LC Interface: RNC/2.LC -> AC RNC/2.LC -> PS |

TABLE-continued

OVERVIEW OF USED LOAD CONTROL PARAMETERS

| PARAMETER NAME | MEANING/DEFINITION |
|---|---|
| PtxDownlinkTotal_Max | related functions: admission control, packet scheduling, load control<br>maximum downlink power of BS transmitter<br>fixed, BS performance specification<br>the parameter defines the maximum downlink transmission power of the base station<br>Source: RNC/2.LC<br>Interface: - (none)<br>related function: load control |
| EbNoPlannedUplink | planned average uplink Eb/N0<br>radio network planning parameter<br>the parameter defines the panned average uplink Eb/N0-value. The parameter is dependent on the cell, bearer type (RT or NRT) and bit rate<br>Source: RNC<br>Interface: RNC internal<br>related functions: admission control, load control, packet scheduling |
| GuaranteedBitRate_Uplink | minimum guaranteed uplink bit rate determined for each radio access bearer<br>Source: RNC/AC<br>Interface: RNC/AC -> PS<br>related functions: admission control, packet scheduling |
| GuaranteedBitRate_Downlink | minimum guaranteed downlink bit rate for the radio access bearer determined on a per connection basis<br>Source: RNC/AC<br>Interface: RNC/AC -> PS<br>related functions: admission control, packet scheduling |
| PrxNc | received interference power from non-controllable users (in UL)<br>load control, real time calculation<br>load control estimates PrxNC from current PrxTotal and the interference of own cell NRT users (PrxNrt). PrxNc usually contains the interference and noise from the own cell RT-users, from own cell NRT users with minimum guaranteed bit rate, from users in other cells and system noise. It is also possible to include all the interference due to own cell NRT users to PrxNRT<br>Source: RNC/2.LC<br>Interface: RNC/2.LC -> AC RNC/2.LC -> PS<br>related functions:<br>Admission control, load control, packet scheduling |
| PrxNrt | transmitted power to NRT users<br>packet scheduler, real time estimation<br>packet scheduler estimates the transmission power which is need for the allocated NRT users<br>Source: RNC/PS<br>Interface: RNC/PS -> load control<br>related functions: load control, packet scheduler |
| PrxChange | change in received power due to new, released or modified bearer<br>calculated whenever a RT bearer is added, released or modified<br>Change in total received power. When the admission control admits a new RT bearer (or a RT bearer is released or modified), it estimates the change (PrxChange) in the total received power |

TABLE-continued

OVERVIEW OF USED LOAD CONTROL PARAMETERS

| PARAMETER NAME | MEANING/DEFINITION |
|---|---|
| | level<br>Source: RNC/AC<br>Interface: RNC/AC -> Load control<br>related functions: admission control, load control |
| LChangeUplink | uplink load factor of new, released or modified bearer<br>admission control, real time calculation<br>uplink load factor of the new admitted bearer is used to estimate the change in total received power due to the new, released or modified bearer<br>Source: RNC/AC<br>Interface: RNC/AC -> Load control<br>related functions: admission control, load control |
| LChangeDownlink | downlink load factor of new, released or modified bearer<br>admission control, real time calculation<br>downlink load factor of the new admitted bearer is used to estimate the change in total transmitted power due to the new, released or modified bearer<br>Source: RNC/AC<br>Interface: RNC/AC -> Load control<br>related functions: admission control, load control |
| PrxTarget | target for received power (in uplink)<br>radio network planning parameter<br>target value for received total wideband interference power in a cell<br>Source: RNC/2.LC<br>Interface: RNC/2.LC -> PS RNC/2.LC -> AC<br>related functions:<br>admisison control, packet scheduling, load control |
| PrxThreshold | uplink load threshold for load control<br>radio network planning parameter<br>planned threshold for received total wideband interference power in the cell. The threshold is equal to PrxTarget + allowed margin. If load exceeds the threshold, load control starts to act.<br>Source: RNC/2.LC<br>Interface: RNC/2.LC - internal<br>related functions: load control |
| LUplink | uplink connection based load factor<br>load control, real time calculation<br>uplink connection based load factor is Eb/No divided by processing gain. The Eb/No can be either the measured Eb/No, Eb/NoAve, (in closed loop PC when UL TPC commands are overwritten in case of overload) or planned Eb/No, EbNoPlanned which is used if measured Eb/No is not available) or Eb/No setpoint, Eb/NoSetpoint, provided by outer loop PC.<br>Source: RNC/2.LC<br>Interface: RNC/2.LC -> AC, RNC/2.LC -> PS<br>Related functions: Admission Control, Load Control, Packet Scheduling |
| LTotalUplink | total uplink load factor<br>load control, real time calculation<br>toatal uplink load factor is used to estimate the total received power. Total uplink load factor includes both load factors of own cell non-controllable bearers and NRT bearers |

TABLE-continued

OVERVIEW OF USED LOAD CONTROL PARAMETERS

| PARAMETER NAME | MEANING/DEFINITION |
|---|---|
| LNcUplink | Source: RNC/Load control (2.LC)<br>Interface: RNC: 2.LC -> AC,<br>LC -> PS<br>Related Functions: Admission Control,<br>Load Control, Packet Scheduling<br>uplink load factor of non-controllable users<br>load control, real time calculation<br>uplink load facto of non-controllable users is used to estimate the total received power from non-controllable users<br>Source: RNC/load control ("2.LC")<br>Interface: RNC/2.LC -> AC<br>RNC/2.LC -> PS<br>related functions: admission control, load control, packet scheduling |
| FractionalLoad | Uplink fractional load, which can be calculated from PrxToral and PrxNoise.<br>load control<br>Source: RNC/2.LC<br>Interface: RNC/2.LC -> AC<br>related functions: admission control, load control |
| OtherToOwnPrxTotal | Uplink other-cell-to-own-cell interference ratio<br>measured on cell basis (100 ms–500 ms)<br>the parameter is the current average other-cell-to-own-cell interference ratio, which is used in estimation of the power increase due to change in bit rates of NRT-bearers by packet scheduler or new, released or modified bearer by admission control<br>Source: BS<br>Interface:<br>BS -> RNC/2.LC, L3/RR indication<br>RNC/2.LC -> AC<br>RNC/2.LC -> PS<br>related functions:<br>admission control, load control, packet scheduling |
| PtxTotal | Total transmitted power in DL<br>measured on cell basis (100 ms–500 ms)<br>total transmitted power in a cell measured by BS<br>Source: BS<br>Interface:<br>BS -> RNC/2.LC, L3/RR indication<br>RNC//2.LC -> AC<br>RNC/2.LC -> PS<br>related functions:<br>admission control, load control, packet scheduling |
| PtxNC | transmitted power to non-controllable users (in DL)<br>load control, real time estimation<br>load control estimates PtxNc from current PtxTotal and the interference of the own cell NRT users (PtxNrt).<br>PtxNc usually contains the transmission power from BS to RT-users and NTRT-users with minimum guaranteed bit rate.<br>It is also possible to include all the needed/used transmission power to NRT users to PtxNRT<br>Source: RNC/2.LC<br>Interface:<br>RNC/2.LC -> AC<br>RNC/2.LC -> PS<br>related functions:<br>admission control, load control, packet scheduling |
| PtxNRT | transmitted power to NRT-users (in DL) |

TABLE-continued

OVERVIEW OF USED LOAD CONTROL PARAMETERS

| PARAMETER NAME | MEANING/DEFINITION |
|---|---|
|  | packet scheduler, real time estimation<br>packet scheduler estimates the transmission power which is needed for the allocated NRT users<br>Source: RNC/PS<br>Interface: RNC/PS -> Load control<br>related functions: packet scheduling, load control |
| PtxChange | change in transmitted power due to new, released or modified bearer<br>calculated whenever a RT bearer is added, released or modified<br>change in total transmitted power. When the admission control admits a new RT bearer (or a RT bearer is released or modified), it estimates the change (PtxChange) in the total transmitted power level<br>Source: RNC/AC<br>Interface: RNC/AC -> load control<br>related functions: admission control, load control |
| PtxTarget | Target value for transmitted power<br>radio network planning parameter<br>target (in downlink) for transmitted power in a cell. (e.g. 10–20 W)<br>Source: RNC/2.LC<br>Interface:<br>RNC: 2.LC -> PS<br>2.LC -> AC<br>related functions:<br>admission control, load control, packet scheduling |
| PtxThreshold | downlink load threshold for load control<br>radio network planning parameter<br>planned threshold for transmitted power in a cell. Threshold is equal to PtxTarget + allowed margin. If load exceeds the threshold, load control starts to act.<br>Source: RNC/2.LC<br>Interface: RNC/2.LC -internal<br>related functions: load control |
| AveTrxPower | averaging period for total received and transmitted power<br>radio network configuration parameter<br>the parameter defines the averaging period which is used by the BS when it calculates both, the total received power level (PrxTotal) and the total transmitted power level (PtxTotal)<br>Source: RNC<br>Interface: RNC -> BS |
| RRIndicationPeriod | Reporting period of radio resource indication (e.g. 20 ms to 500 ms)<br>radio network configuration parameter<br>the parameter defines the reporting period of the Radio Resource Indication messages<br>Source: RNC<br>Interface: RNC -> BS |
| EbNoMeasured | Average measured Eb/N0<br>measured on radio link basis<br>This parameter can be used to evaluate the interference caused by the connection. This parameter is more accurate than the Eb/N0 target set by outer loop power control since this parameter does not have (much) bias and the EB/N0 target is not the same as the real received Eb/N0. Averaging over e.g. one frame could be used<br>Source: BS |

TABLE-continued

OVERVIEW OF USED LOAD CONTROL PARAMETERS

| PARAMETER NAME | MEANING/DEFINITION |
|---|---|
| | Interface: |
| | BS -> RNC/power control PC, Frame control layer FLC |
| | RNC: PC -> 2.LC, PC -> AC, PC -> PS |
| | related functions: |
| | admission control, load control, packet scheduling |
| EbNoPlanned_Downlink | planned average downlink EB/N0 radio network planning parameter the parameter defines the planned average downlink Eb/N0-value. The parameter is dependent on the cell, bearer type (RT or NRT) and bit rate |
| | Source: RNC |
| | Interface: RNC internal |
| | related functions: |
| | admission control, load control, packet scheduling |
| PtxAverage | average transmitted power per connection (in DL) measured on connection basis |
| | Source: BS |
| | Interface: |
| | BS -> RNC/2.LC, L3/RR indication |
| | RNC//2.LC -> AC |
| | RNC/2.LC -> PS |
| | related functions: |
| | admission control, load control, packet scheduling |

C) General Description of Load Control Functionality

Thus, based on the above overview of the network architecture and the used parameters for load control, the function of the load control method is described below.

It is to be noted that the entire function realized by the load control method is achieved by the combination of the two stage traffic load control, i.e. load control means located in the respective base stations BS as well as in the radio network controller RNC.

If the telecommunication network system is properly planned and admission control as implemented by the admission control means AC works sufficiently well, overload situations should be exceptional, not the rule. However, if an overload situation is encountered, carrying out the proposed load control method results in returning the system back to the feasible state, i.e. the currently used system radio resources UL total interference power (per sector)

DL total transmission power (per sector)

are below planned load control reference values (target and/or threshold values), which indicate overload situation.

The prevention of such overload situations is mainly handled by the admission control means AC and due to a proper setting of load target (also referred to as first reference load value) and threshold in the course of radio network planning (RNP), and also by the implemented load control function.

A load target (reference load value) is set in the course of radio network planning RNP so that it will be the optimal operating point of the system load, up to which packet scheduling means or packet scheduler PS, respectively, and admission control means AC can operate.

Instantaneously this target load will and can be exceeded due to changes of interference and propagation conditions. If the system load will however exceed load threshold, the load control method will return the load below that threshold. Load control actions are always an indication of an overloaded cell and/or sector of the respective base station BS and the load control actions will lower the system capacity in a to some extent undesirable and not fully predictable way.

An area named load area from load target to load threshold ("marginal load area in FIG. 2) can be seen as very valuable soft capacity of the system (e.g. an WCDMA system), which is wanted to be fully exploited. The load control functionality is located both in the base station BS (1.LC) and in the radio network controller RNC (2.LC).

In the base station BS the load control can be realized either in a distributed manner for each Channel Element (CE) or in a centralized and optimized manner in a corresponding Base Station Control Unit (BCU) in BS, which controls channel elements.

The load control method according to the present invention can do following actions, in order to reduce load:

manipulate, i.e. deny (DL) or overwrite (UL) TPC commands (TPC=transmit power commands), or reduce a target value of Eb/N0 in the base station either using base station control unit BCU or in distributed fashion by each channel element itself (located in base station, i.e. "1.LC" in FIG. 1)

interact with packet scheduling device PS and throttle back NRT traffic lower Eb/No target for selected real-time (RT) users lower bit rates of real-time users within a transport format set (TFS)

stop transmission of the most critical downlink DL connections for a while perform and/or initiate hand-over to another carrier re-negotiate real-time services to lower bit rates drop calls in a controlled fashion.

The individual possible load control method steps are presented above in the order of the usage. This means that first fast load control (first stage) in the base station BS is used, then additionally using the second stage load control in the radio network controller RNC, the packet scheduling device PS is commanded to reschedule non-real time (NRT) transmission and so on.

Nevertheless, the present invention is not restricted to the above presented order of usage of individual method steps. Namely, all individual steps can be combined in a convenient order that exhibits best results for respective application cases, so that any possible combination of the above listed method steps is conceivable and can be implemented, if desired, without difficulty. In particular, it should be noted that although the above description has been made with a focus on using two reference load values, one reference load value is sufficient for the proper realization of the proposed method. Namely, due to the load reference value being defined, a first (fast) load control method can be activated when the first reference load value is exceeded. The second (slower) load control method can additionally be activated when i) the first reference load value is exceeded (simultaneous activation), ii) when a subsequent monitoring yields that the first (fast) load control did not reduce the traffic load below said reference value, or iii) when even with the first (fast) load control being activated the traffic load also exceeds a second reference load value. (The second reference load value can be equal to or higher than the first reference load value.)

The overload threshold PrxThreshold for uplink (and/or PtxThreshold for downlink) as the second reference load value is a point determined by the radio network planning RNP such that it is at a value given in decibels (dB's) over noise floor in uplink (and/or downlink). The noise floor is predetermined on base station BS basis, i.e. per sector or cell. By setting this threshold the radio network planning guarantees that the coverage is retained in case the cell shrinking is utilized as a load control method. In the most simplest form of load control, the base station BS (1.LC of BS) just commands all or some mobile station terminals MS to drop powers for uplink overload. For downlink, the base station BS (1.LC of BS) at least denies to increase powers, and may also decrease power, as set out in greater detail further below. If this is not enough during longer time period, some of the load control method steps of the radio network controller RNC side (actions of 2.LC in RNC) presented in this document can/will be used.

In addition to the above load control method steps, the load control of the radio network controller RNC is also responsible for updating and providing to the admission control means AC and packet scheduling means PS the load related information, which is available in the radio network controller RNC (i.e. load vector). This information includes the above explained parameters PrxTotal, PtxTotal, PrxNc, PtxNc, PrxChange, PtxChange, FractionalLoad, LUplink, LTotalUplink, PtxAverage and OtherToOwnPrxTotal.

The total uplink interference power PrxTotal and total downlink transmission power PtxTotal are reported periodically (e.g. every 100 ms or even more seldom) to the radio network controller RNC from base station BS by using radio resource (RR) indication by using a layer three signaling.

The total uplink interference power of non-controllable users PrxNc, and the total downlink transmission power of non-controllable users PtxNc is calculated as follows:

PrxNc=PrxTotal−PrxNrt, and PtxNc=PtxTotal−PtxNrt.

PrxNrt is the estimated total interference power of NRT-users and PtxNrt is the estimated total transmitted power of NRT-users. Both parameters are provided by the packet scheduling means PS. Alternatively, PrxNrt and PtxNrt can be calculated in that the connection based minimum guaranteed bit rate is subtracted from the bit rate of each non-real time user. In this case, for example, PrxNrt includes the estimated total interference of bits allocated additionally to non-real time users above their minimum guaranteed bit rates. PrxChange (in UL) and PtxChange (in DL) are the estimated power increments due to new bearers admitted by the admission control means AC. PrxChange and PtxChange are set to zero when new values for PrxTotal and PtxTotal are received. Before that, according to the proposed-load control method, the load control means LC sums PrxChange to PrxNc, and PtxChange to PtcNc in order to keep track on changed load situation. The Fractional load is calculated from noise rise (PrxTotal/System Noise) as is explained in the equations mentioned in the annex to this specification. OtherToOwnPrxTotal (other to own cell interference ratio (cf. also annex) is the other cell interference power divided by own cell interference power, where other cell interference power is the total interference power PrxTotal subtracted by the own cell interference power and system noise. Own cell interference power is the uplink UL loadfactor LTotalUplink multiplied by PrxTotal, where in addition LTotalUplink is sum average of measured Eb/No's divided by processing gains of active bearers (with Eb/N0 denoting the energy per bit to noise power density ratio).

LUplink contains the connection based load factor. If this cannot be reported from the base station BS to the radio network controller RNC, values provided (i.e. set) by the radio network planning RNP are used. PtxAverage is the average transmitted power per connection basis. Both FractionalLoad and OtherToOwnPrxTotal (which parameter OtherToOwnPrxTotal is not necessarily required for the proposed load control methods) are calculated in the base station BS and then reported periodically (e.g. every 100 ms) to the radio network controller RNC from the base station BS by using RR indication.

D) Load Control Method

In the following an example for a load control in uplink as well as in downlink is described. Nevertheless, other combinations of the individual method steps can be implemented without difficulty, as stated already herein above.

D)I) Uplink Load Control Method

The task of uplink load control is to keep the total uplink interference power of a sector (corresponding, e.g., to a coverage area of a base station BS) below some given overload threshold, called here PrxThreshold, which is considered to be the point after which the system is in overload.

Figure 2:
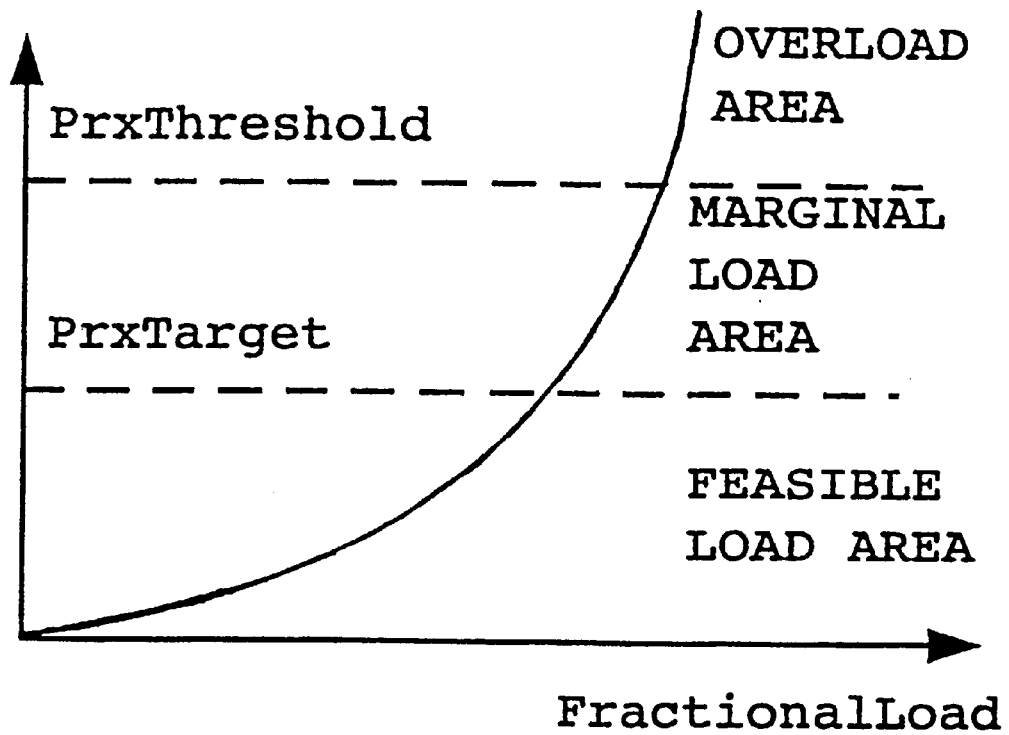
FIG. 2 shows a diagram of an example of the applied reference load values for load control with reference to load control in uplink transmission.

In FIG. 2 is presented a schematic example of an uplink load curve, i.e. mapping from fractional load to total wideband interference at a digital receiver of the base station in the sector. From FIG. 2 can be seen graphically the exponential growth of PrxTotal as a function of increase of fractional load.

The planned target load as a first reference load value in uplink is denoted by PrxTarget, and an overload situation is encountered if PrxTotal exceeds PrxThreshold as a second reference load value.

PrxTarget itself can in an alternative implementation further be split into two values: PrxTargetNC (for non controllable i.e. real time RT users) and PrxTargetNRT (for non-real time users). In this case, the following relation is defined to hold: PrxTarget=PrxTargetNC+PrxTargetNRT. Usually, the load originating from real time users, the interference originating from other cells, the system noise and load attributable to non-real time users with minimum guaranteed bit rate are planned to be less or equal to PrxTargetNC. In this case, PrxTargetNRT includes interference due to the bit rates assigned for transmission to non-real time users which bit rates exceed the minimum guaranteed bit rates. For example, the packet scheduling means PS has allocated 64 kbit/s bit rate for certain non-real time users, whose minimum guaranteed bit rate is only 16 kbit/s. The difference 64−16=48 kbit/s is the difference which causes load and interference PrxNRT. PrxNRT is then planned to be less or equal to PrxTargetNRT, and if PrxNRT exceeds PrxTargetNRT, load control actions for only NRT users can be initiated (like for example TPC-command modifications, reduction of bit rates exceeding minimum guaranteed bit rates by the packet scheduling means PS, etc.). Then, PrxNC can be assumed to contain load due to real time RT users, load due to NRT users operated with the minimum guaranteed bit rate, the interference caused by other cells, and system noise, and PrxNC is planned to be below or equal PrxTargetNC. If, however, this value is exceeded, load control actions can be initiated for concerned users, i.e. non-controllable, real time users. Nevertheless, it is in most cases such that the reference value PrxTarget is not split for real time and non-real time traffic.

If the load threshold, PrxThreshold, and/or the load target, PrxTarget, is exceeded, the load control means 1.LC of the base station BS and 2.LC of the radio network controller RNC start to react by using the following tools:

1. Firstly, each base station BS individually starts to overwrite/modify uplink transmit power control commands, both for non-real time (NRT)-users and for real-time (RT)-users as follows For NRT-users (Equation (1)):

TPC_REFERENCE
=$[(Eb/N0)/(Eb/N0\_Target)][PrxTotal/PrxTarget]^{n1}$,
when PrxTotal>PrxThreshold, and =1, when PrxTotal>PrxThreshold, where 0<n1, or
=[Eb/N0)/(Eb/N0_Target)][PrxThreshold/PrxTarget]$^{n1a}$
*[PrxTotal/PrxThreshold]$^{n1b}$, when PrxTotal>PrxThreshold, where 0≦n1a, 0≦n1b, and usually n1a≦n1b, and if TPC_REFERENCE>-1, then a TPC command is set to -1, TPC_COMMAND=-1, while otherwise a transmit power control command is set to +1, TPC_COMMAND=1. This means that the transmit power is either decremented (TPC_Command=-1) by a certain step ΔTPC, or incremented by the corresponding step (TPC_Command=1).

For RT-users (Equation (2)):
TPC REFERENCE
[=(Eb/N0)/(Eb/N0_Target)], when PrxTotal≦PrxThreshold, and
=[(Eb/N0)/(Eb/N0_Target)][PrxTotal/PrxThreshold]$^{n2}$, when PrxTotal>PrxThreshold,
where 0≦n2,
and if TPC_REFERENCE≧1, then TPC_COMMAND=-1, otherwise TPC_COMMAND=1, which likewise means that the transmit power is either decremented (TPC_Command=-1) by a certain step ΔTPC, or incremented by the corresponding step (TPC_Command=1)

The "idea" and meaning of equations (1) and (2) resides in that in the uplink the closed loop power control is further stabilized with a weak power feedback, namely, an increase in total interference power level (PrxTotal) causes a slight decrease in Eb/No. This power feedback makes the whole system stable under temporary overload condition. When Eb/No values of the active own cell connections (i.e. connections active in a respective cell of interest) decrease, the total uplink interference power level will decrease, too, and the state/load of the system will return back to the feasible and/or marginal load area (PrxTotal below PrxThreshold).

When the above indicated action is applied in a situation in which the system faces an overload situation, the load control "2.LC" in the radio network controller RNC is reported the overload situation. In this case, the load control LC denies the outer loop power control (PC) to increase Eb/No targets in order to avoid unnecessary increase of Eb/No targets because of artificial reduction of bearer quality by the load control LC.

The algorithm presented in the equations (1) and (2) above starts in a first stage of load control to decrease slowly the Eb/No of NRT-users, when the system load exceeds the target load (i.e. PrxTotal>Target), but this action should be very gentle or could even be parameterized out by choosing for example n1=0. If PrxTotal exceeds PrxThreshold (i.e. the sector is in overload situation), in a second stage of load control the power down commands will be sent to the mobile terminals MS in case of a respective NRT-user, in which case Eb/No's of NRT-users will be reduced until overload is overcome (i.e. PrxTotal<PrxThreshold). In an overload situation the Eb/No's of RT-users are gently reduced based on the method presented in equation (2), i.e. by transferring the operating point of the fast closed loop PC by n2*(PrxTotal-PrxThreshold) dB. For example if n2=0.25, PrxTotal=9 dB and PrxThreshold=6 dB, the power up/down threshold for fast closed loop PC will be
[(Eb/N0)/(Eb/N0_Target)]*2$^{0.25 \sim 1.2}$*[(Eb/N0)/(Eb/N0_$Target$)]
which indicates 20% smaller Eb/No's.

It may also be possible to be decided by base station control unit (BCU) of which connections the power is to be reduced by overwriting uplink transmit power control commands (UL TPC commands). In this case the power of most critical connections (biggest load factor LUplink or biggest measured average Eb/No) will be reduced. However then the base station control unit should be reported the Eb/No's and bit rates of each connection. It is also possible that the base station control unit BCU determines which connections are the most critical connections and then overwrites the Eb/N0 target values for those connections so as to be smaller than before the overload situation occurred (e.g. 0.5 dB smaller).

An additional point to be considered, especially for fast load control (first stage) in base stations BS is that there is only one closed loop power control PC running for multi-bearers. Therefore, reduction of power has to be effected code channel based, in which case RT and NRT bearers have to be dealt with together and not separately.

Possible priorities of the bearers can be taken care of by a couple having different values for n1 (or n1a and n1b) and n2 as a function of the priority. For example there can be three different values: n1=n2=½ (smallest priority class), n1=n2=¼ (second priority class) and n1=n2=0 (biggest priority class).

Alternatively, the values of n1 (or n1a and n1b) and n2 can depend on the average used bit rate, so that bigger values are used for bigger bit rates (more power is in the average reduced). For example there can be three different values: n1=n2=½ (biggest bit rate class), n1=n2=¼ (second biggest bit rate class) and n1=n2=0 (smallest bit rate class).

Furthermore, if the values of n1 and n2 are desired to be dependent on both, priorities and bit rates in combination, it is conceivable in an easiest way to use the calculated maximum of the values of n1 and n2 (e.g. second priority: n1=¼ and biggest bit rate: n1=½, in which case the final value of n1=½ results as the maximum). If real time RT and non-real time NRT bearers are multiplexed together, an RT bearer is usually dominant, so that the TPC command modifications affect only for RT bearers. Moreover, it is also possible that each channel element reduces the Eb/N0 target value by m1 (e.g. 0.5 dB), in case of a NRT connection with PrxTotal having exceeded PrxTarget but being still below PrxThreshold (PrxTotal∈]PrxTarget, PrxThreshold[), and by m2 (e.g. 1 dB) in case of a NRT connection and if PrxTotal exceeds or is equal to PrxThreshold, or by m3 (e.g. 0.5 dB) in case of a RT connection and PrxTotal exceeds or is equal to PrxThreshold.

The effect of incorporation of this idea will replace the need of base station control unit BCU actions.

However, it should be noted that although in the above examples the parameters n1 and n2 were described as assuming the same value, it is also possible to use respective different values for these parameters. This will lead to a preference of some traffic component, i.e. real time or non-real time traffic dependent on the chosen parameter value.

2. Interacting with the packet scheduling means PS and throttling back non-real time traffic (NRT traffic). This is done by the load control means 2.LC of radio network controller RNC. In response, the packet scheduling means PS will decrease bit rates of the non-real time traffic component, so that PrxTotal will be reduced below PrxThreshold by using an uplink power increase estimator. In this way, the real time traffic component or RT-traffic component, respectively, is implicitly preferred when compared to the NRT-traffic component.

In this connection, it is also beneficial to reduce NRT bit rates when PrxTotal Exceeds PrxTarget+PrxDelta, with PrxDelta greater or equal to zero. In such a case, bit rates are reduced so that the monitored load indication parameter PrxTotal will assume a value below or equal to PrxTarget, or stated in other words PrxTarget≧PrxTotal. (The same kind of control scheme may be adopted in downlink direction, too, if PtxTotal is greater than PtxTarget+PtxDelta, with PtxDelta greater or equal to zero, then NRT bit rates are reduced.)

3. Reducing bit rates of real time users (RT-users) in already negotiated bit rate set, i.e. within the transport format set (TFS). In other words, limiting the transport format TF in the transport format set TFS. The load control means "2.LC" of the radio network controller RNC does this action. In this connection, it will however be necessary for the load control means LC to know whether the service can subsequently handle smaller bit rate than the service currently uses, even in case of variable bit rate circuit switched services.

The load control "1.LC" of the base station BS makes the first correction to the system load by lowering rapidly, but perhaps only temporarily, the average power of uplink users. Subsequently additionally lowering bit rates of NRT and RT-users does the final correction to the system load by the load control "2.LC" of the radio network controller RNC.

Therefore, if the reduction of NRT bit rates was not enough and the system is still in overload, the load control means "2.LC" of the radio network controller RNC starts to reduce bit rates of RT-users until overload is overcome. It is possible to reduce at once the estimated new PrxTotal clearly below PrxThreshold by lowering bit rates instead of adjusting the new total interference power to PrxThreshold. This may make the system more stable (no altering around PrxThreshold). In this case the bit rates are reduced until the estimated new PrxTotal is some margin below PrxThreshold, i.e. PrxTotal<PrxThreshold-PrxOffset, where PrxOffset is between zero and PrxThreshold-PrxTarget.

The reduction of uplink bit rate is always rather time-consuming, because the change in bit rate has to be signaled to a respective mobile station MS. The reduction of bit rates of RT-users can be implemented a bit differently based on fairness policy used. Therefore, bit rates of most critical connections (biggest load factor) are reduced proportionally either more or equally than bit rates of less interfering connections. Such calculations are based on the use of a power increase estimator means, which is not to be discussed here. The bit rate reduction method as explained above could be formulated as follows:

while (PrxTotal>PrxThreshold-PrxOffset)
  reduce the bit rate of RT-users whose load factor is the biggest to the previous bit rate which is possible within TFS
end 4. Re-negotiating through the admission control means AC the RT-services to lower bit rates, which are not in the bit rate set of the transport format set TFS, or to lower the minimum bit rate of NRT-services.

This is done by the load control means of the radio network controller, if previous load control actions did not result in a sufficient load reduction. This action is otherwise similar to previous action, but now the bit rates are tried to be re-negotiated lower through the admission control means AC. This action is however rather time-consuming and does not help to temporary/immediate overload.

5. Temporarily stopping uplink UL data transmission, if a certain number of consecutively received radio frames (of 10 ms duration each) are so-called bad-frames the transmission of which was "not o.k."). This means that if k1 consecutive donwlink DL radio frames were "not o.k." (k1 for example being 10), then a mobile station MS will stop the data transmission (the dedicated physical data channel DPDCH is disabled) in uplink, and only the dedicated physical control channel DPCCH is maintained active. When the mobile station MS receives again k2 consecutive radio frames (of 10 ms duration), k2 being for example 2, the uplink transmission is enabled again. Such an action is beneficial when uplink as well as downlink are overloaded because in that case layer 3 signaling from the load control means of the radio network controller to the mobile station may fail.

6. Dropping calls in a controlled fashion. If bit rates cannot be re-negotiated to a lower level anymore and the system is still in overload situation, which means that PrxTotal.>PrxThreshold, the load control means "2.LC" of the radio network controller RNC drops randomly selected RT-users or RT-users which have biggest load factor (most critical connections) until system load is under PrxThreshold-PrxOffset, where PrxOffset can be also zero.

The dropping of calls in uplink can be quite time-consuming when the mobile station MS is signaled via layer three signaling to stop the connection. This can be also so that a connection is put into a discontinuous transmission mode DTX and power down commands are only sent to the mobile station MS.

Actions or method steps, respectively, (2) to (6) can be very briefly and simply described as follows (while it has to be noted that action (3) is not always possible since the radio network controller does not necessarily have a knowledge of whether the current (RT) application can tolerate lower bit rates within its transport format set TFS if the application itself requests a bigger bit rate):

If PrxTotal=PrxNc+PrxNrt>PrxThreshold
  then reduce NRT bit rates
  until PrxEstimated=PrxNc+ΔPrxNrt
    =PrxNc+PrxNrt$_{new}$−PrxNrt$_{old}$
    ≦PrxThreshold
if still PrxEstimated>PrxThreshold
  then try to re-negotiate RT bit rates to lower bit rates until PrxEstimated≦PrxThreshold          if          still PrxEstimated>PrxThreshold
  then drop/stop most critical bearers (minimum priority/ maximum       load       factor)       until PrxEstimated≦PrxThreshold The above method steps can be interpreted so that first PrxNrt is reduced by amount of ΔPrxNrt by the packet scheduling means PS. The new total power estimated will then be PrxEstimated=PrxTotal+ΔPrxNrt and if that is still above PrxThreshold, then bit rates of RT-users are reduced within their transport format set TFS. If even that is not enough, bit rates of some RT-users are tried to be re-negotiated. Naturally, if at the last time all the NRT-traffic was throttled back and new measured PrxTotal received by the load control means of the radio network controller RNC from the load control means of the base station BS by using an OverLoadIndication (based on RR Indication), bit rates of RT-users are touched and so on.

D)II) Downlink Load Control Method

In the following there is presented a simple way to implement downlink load control. The task of downlink load control is to keep the total downlink transmitted power of a sector (e.g. cell of a base station) below a given load threshold as a second reference load value (PtxThreshold) provided and/or set by the radio network planning RNP. This load threshold, PtxThreshold is considered to be the limit after which the downlink transmission DL is in overload, which means that the total transmitted power is too much. The same signaling between the load control means of the radio network controller RNC and the load control means of BS is used in downlink DL as in uplink UL. (The principles of the signaling will be explained in the subsequent section.) Also, the downlink load control method in terms of realized function and effect achieved is closely related to the one adopted in uplink:

1. If overload is encountered in DL, namely if PtxTotal exceeds PtxThreshold, then the load control means LC of the base station BS will sent an overload indication to each active channel element. This indication includes PtxTotal or PtxTotal/PtxThreshold. Then, in respective channel elements the fast closed loop power control (PC) starts to deny downlink DL transmit power commands (TPC commands) both for NRT-users and for RT-users. If PtxTotal exceeds PtxThreshold, the transmission power of NRT-users is in each slot reduced (decremented) by the fast closed loop PC step size and the power of RT-users is decreased or kept the same (not changed if normal power control PC action would be power increase, thereby at least not increasing the power). By using this method, the total transmitted downlink DL power of a sector cannot exceed PtxThreshold. This is the proposed fast downlink DL load control method as implemented in the base station BS.

If total measured transmission power of the sector is between PtxTarget and PtxThreshold (i.e. in the so called marginal load area, cf. FIG. 2), slower and downwards biased power control is used for NRT-users. This means that power is reduced if n3 (e.g. n3=1) consecutive TPC commands of "1" are received, and power is raised or increased only, if n4 (e.g. n4=2) consecutive TPC commands of "+1" are received, while otherwise power is untouched. If downlink power control is wanted to be unbiased in marginal load area, n3 and n4 are selected to be the same. The idea behind such slower power control is prevention of rapid changes in powers.

In addition, there is possibility that linear power amplifier limit (the maximum base station BS transmission power) is reached. In this case total downlink transmission power, PtxTotal, cannot anymore be increased and the transmission power of each user is implicitly reduced by the same percentage so that PtxTotal equals the maximum BS transmission power.

2. Interacting with the packet scheduling means PS and throttling back non-real time (NRT) traffic. This is done by the load control means LC located in the radio network controller RNC. The packet scheduling means PS will decrease NRT bit rates, so that PtxTotal will be below PtxThreshold. This is done by using downlink power increase estimator.

3. Reducing bit rates of real time RT-users in an already negotiated bit rate set, i.e. within the transport format set (TFS). The load control means LC of the radio network controller RNC effects this action. The bit rates are reduced so that downlink DL transmission power will be below PtxThreshold or PtxThreshold-PtxOffset. In the latter case, the downlink DL total transmission power is reduced a given margin below the load threshold in order to prevent new overload situation immediately.

The reduction of DL bit rate of RT-users can be implemented either such that the load control means instructs respective real-time (RT) users to use a lower bit rate which is possible within the transport format set TFS, or such that the load control means LC instructs only the most critical RT bearers (having the biggest DL Perch Ec/Io or biggest average transmission power (if this information is available in DL)) to reduce their bit rates within their transport format set TFS. The latter is proposed. The calculation is based on the use of downlink power allocation. The method steps in this regard of the bit rate reduction method in downlink DL can be expressed as follows while (PtxTotal>PtxThreshold-PtxOffset)
  reduce the bit rate of RT user whose average transmission power is the biggest to the previous possible bit rate within TFS
end 4. Re-negotiating through the admission control means AC the RT-services to lower bit rates, which are not in a bit rate set of the transport format set TFS or to lower the minimum bit rate of NRT-services. This is done by the load control means LC of the radio network controller RNC if previous load control actions were not enough and/or sufficient. This action is otherwise similar to previous the action, but now bit rates are tried to be re-negotiated lower through the admission control means AC. The re-negotiation of bit rates is a rather slow action (e.g. 1 s), because it is rated from load control means LC to admission control means AC and further to a call control means (CC, not shown) and has to be signaled to the mobile terminals MS.

5. Temporarily stopping the downlink DL data transmission of certain (e.g. most critical) real time users. This means that in downlink the dedicated physical data channel DPDCH is turned off (disabled) and that in downlink only the dedicated physical control channel DPCCH is maintained in an active state. If this measure contributes to a reduction of the load such that after a certain time (measured by a timing means for example), the system is no longer in overload, the downlink DPDCH can be reactivated, while otherwise, after the lapse of the certain time, also the DPCCH is disabled and the user is thus ("completely") dropped or disconnected, respectively.

6. Dropping calls in a controlled fashion. If bit rates cannot be re-negotiated to a lower level anymore and the system is still in an overload situation, which means that PtxTotal>PtxThreshold, then the load control means "2.LC" of the radio network controller RNC drops (i.e. instructs the base station BS to drop) randomly selected RT-users or RT-users which have biggest load factor, until system load is under PtxThreshold-PtxOffset, where PtxOffset can be zero. The dropping of a call in downlink DL is much easier than in uplink UL because the mobile terminal MS does not need to be signaled to this effect, but the base station BS can just stop transmission to that mobile terminal MS. Although not expressly mentioned above, it is to be understood that in case of several RT users having a biggest load factor, among these a random selection is conducted to select the RT user connection to be dropped, so that the above indicated measures can be combined. The same combination of those measures is of course also possible in uplink load control.

The maximum possible transmission power of a respective base station BS (maximum output of linear power amplifier; LPA) will be something like 20W (43.0 dBm), for example. Thus PtxTarget is obviously below this value, but PtxThreshold is possibly reasonable to be selected so as to be the same as the maximum of the linear power amplifier LPA output. The proper setting of PtxTarget and PtxThreshold on a per sector (cell) basis is very difficult and is left to radio network planning RNP. Some initial values which according to the inventor's experience appear to be applicable are indicated as the following example values: PtxTarget 15W (41.8 dBm) and PtxThreshold 20W (43.0 dBm). Based on first experimental results, PtxTotal can vary very much as a function of traffic (several dozens of Watts). This makes an intelligent admission control to be difficult, but emphasizes the need for the use of downlink load control.

E) Load Related Messages and Signaling

There will be in total two different load related messages over Iub interface from a respective base station BS to the radio network controller RNC:

a) Simple Radio Resource (RR) Indication Procedure.

This means that there is only the periodic cell specific reporting procedure over Iub (using layer three signaling), i.e. reporting of periodically monitored load indication parameters. The load information updating period should be short enough (in maximum the same order as an average packet scheduling period). However, especially in overload cases (in case of exceeded reference load value) the requirement for reporting immediately (e.g. every 10–30 ms) some load information or at least an overload indication as an indication of the current state of the network from the base station BS to the radio network controller RNC is important for the load control means LC of radio network controller RNC. Similarly the packet scheduling means should be provided with updated load information in order to make right packing decisions.

This message/signaling amount as well as the response requirement does, however, not succeed with hardware resources. Therefore there is a need for separate load reporting procedure for overload situations.

b) Overload Indication Procedure.

This overload indication and overload indication includes information about PrxTotal, PtxTotal and possible load information about most critical connections (at least code ID, bit rate and measured Eb/No or directly load factor LUplink=Eb/No divided by processing gain).

This is send by the load control means "1.LC" of a respective base station BS to the load control means "2.LC" of the radio network controller RNC in order to throttle back non-real time NRT traffic, reduce bit rates for real-time RT calls within the transport format set TFS or by re-negotiating bit rates or to drop calls in controllable fashion. After having received this message the load control means "2.LC" of the radio network controller RNC reports to the admission control means AC and the means of outer loop power control PC of the radio network controller RNC about the overload. In this case, the admission control means AC does not admit new bearers and the means for outer loop PC does not increase Eb/No target before the load control means of the radio network controller RNC has canceled and/or invalidated the overload indication. Very short response requirement supports to locate the load control means close to the power control PC and packet scheduling means PS, if the overload indication message is directed first to the load control.

It would be even possible (as an alternative to the above mentioned) to sent the overload indication to the means for outer loop power control PC of the radio network controller RNC from respective channel elements by using frame control layer signaling FCL in order to deny outer loop power control PC actions. This, however, will cause too much signaling overhead and therefore radio resource RR indication procedure (layer three signaling) is preferred and sufficient.

F) Uplink Load Control and Associated Signaling: Example

Figure 3B:
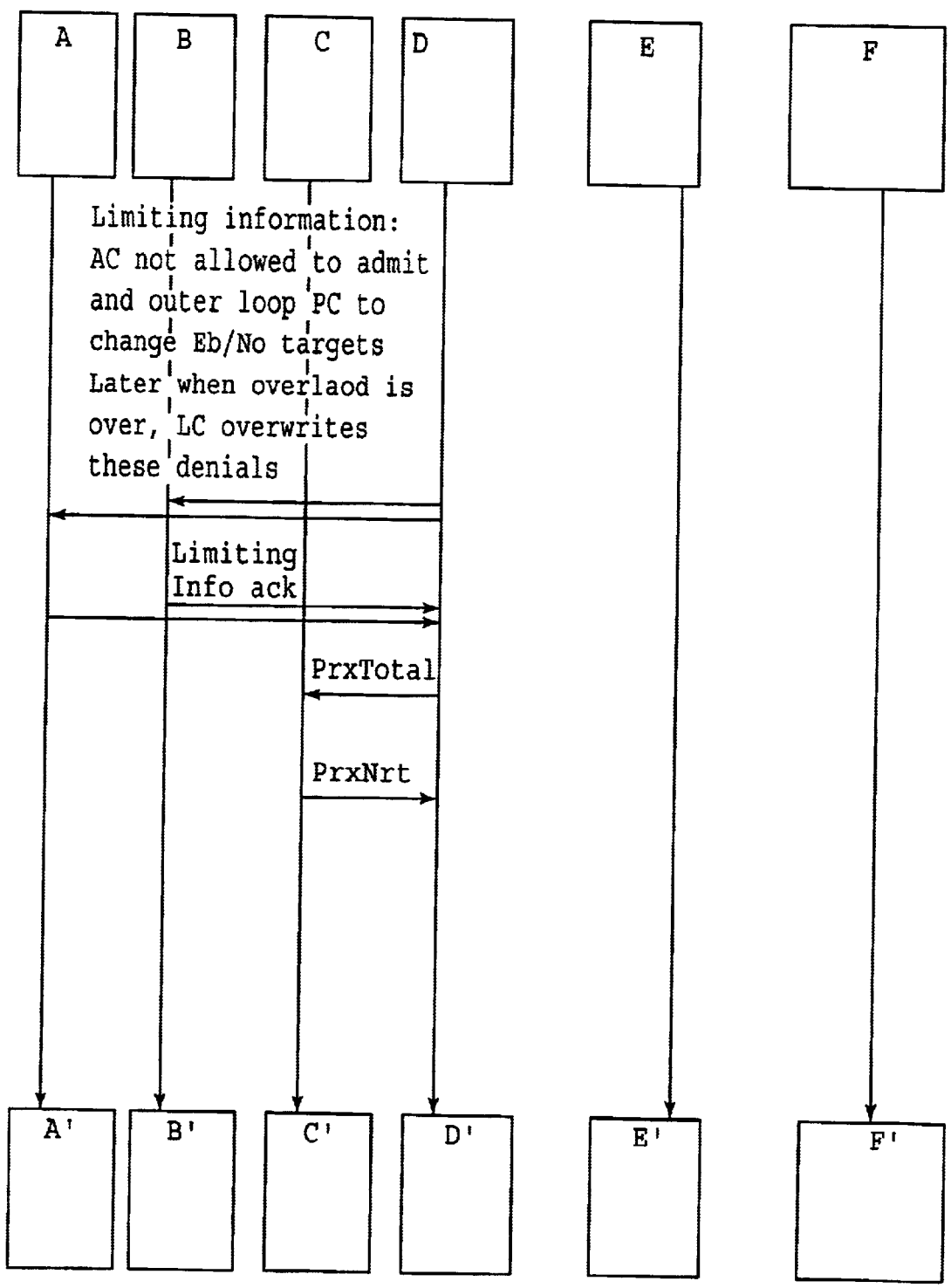
FIG. 3 (FIGS. 3A, 3B, and 3C) illustrates graphically an example of the load control actions and signaling between network components involved, as a function of time, when the traffic load control method of the present invention is applied to a telecommunication system.
Figure 3C:
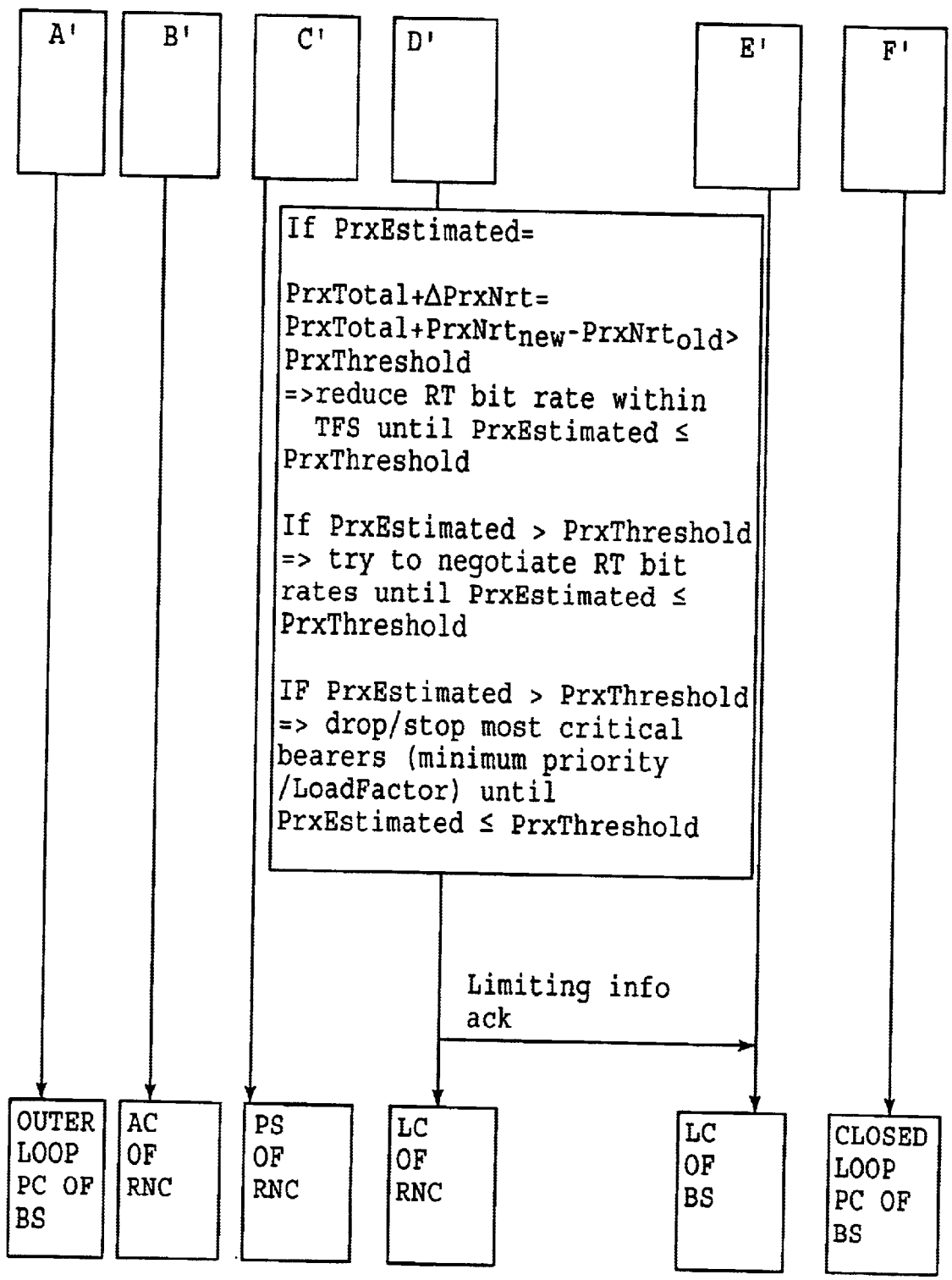

In FIG. 3 (FIGS. 3A to 3C) there is presented the principle of the proposed load control method in uplink graphically.

The horizontal dimension reflects to the different radio resource management RRM functions (and/or corresponding devices) which concern the load control method steps. The vertical dimension represents time and thus indicates when the different load control method steps are carried out, i.e. when the respective actions take place.

The figure can be interpreted so that (FIG. 3A) when the overload is encountered (PrxTotal>PrxThreshold) in the load control means "1.LC" of the base station BS, an overload indication ("limiting info") containing needed information (measured, i.e. monitored PrxTotal and load threshold PrxThreshold or PrxTotal divided by PrxThreshold) to the means for fast closed loop power control PC (provided for each channel element). Then the means for closed loop power control PC will overwrite normal transmit power control TPC commands by using the method steps presented above and send an acknowledgment message back to the load control means LC of a respective base station BS. After that an overload indication including required load information (PrxTotal etc.) is sent to the load control means LC of the radio network controller RNC via the BSAP interface (layer three signaling).

Then (cf. FIG. 3B) the load control means LC of the radio network controller RNC provides the admission control means AC, and the packet scheduling means PS and the means for outer loop power control PC with this overload indication and the above-mentioned load control actions are carried out at the radio network controller RNC side (namely, reduction of NRT and RT bit rates etc.).

The load control means of the radio network controller RNC will also send an acknowledgment to LC of BS that it has been informed about the overload (FIG. 3C).

FIG. 3 has exemplified the proposed method for the uplink direction, while it is to be understood that similar signaling and actions will take place in the downlink direction.

G) Conceivable Modifications

Herein above, only one load threshold in UL and DL, namely PrxThreshold and PtxThreshold have been described for use in connection with the proposed method. However, it is conceivable to use two thresholds. Namely, if two thresholds are used the thresholds, PrxThreshold_1 in uplink UL and PtxThreshold_1 in downlink DL, are used for early prevention of an overload situation, and the higher thresholds, PrxThreshold_2 in uplink UL and PtxThreshold_2 in downlink DL, are the actual overload limits above which the system is in overload. For example in uplink UL overload situation, a slight increase in fractional load will increase the interference power a lot and thus the system capacity is lowered. When the system operates in feasible load area, the system capacity is not remarkable sensible to changes in fractional load. The idea behind two thresholds would be an improved prevention of overload. The use of only one threshold is, however, more easy to handle.

In case of two thresholds in UL and DL, respectively, the load increase above lower threshold PrxThreshold_1 in uplink UL and PtxThreshold_1 in downlink DL, will trigger the first load control actions (mainly additional inter-frequency handover measurements just for load control needs and fast power reduction of NRT-users based on decisions as taken by the load control means of a respective base station BS. The "normal" load control actions as taken by the load control means of the radio network controller-RNC are conducted only if the monitored load exceeds the bigger threshold: PrxThreshold_2 in uplink UL and PtxThreshold_2 in downlink DL.

The advantage of having only one threshold is obviously the simplicity when compared to two-threshold case, while this is nevertheless feasible if desired.

Furthermore, it is conceivable to make use of inter-frequency handover to another carrier. If some other layer of the cell is not so loaded as the cell concerned, the load control means LC of the radio network controller RNC could move, some users into that frequency using handover control. This will stabilize the load of different layers.

Also, reduction of Eb/No targets could be used in uplink UL load control. This is basically quite easy to carry out because both load control means LC and means for outer loop power control PC are located in the radio network controller RNC. However, right now the combination of overwriting/modifying transmit power control commands (TPC commands) by the load control means LC of a base station BS and reduction of bit rates by the load control means LC of the radio network controller RNC is considered to be adequate and an additional reduction of Eb/No targets could result in some "confusion".

Using the load control means LC of a base station BS could be done in a centralized fashion, in that the base station control unit BCU selects the users (the code channels) whose TPC commands are to be modified, or could be done in a distributed fashion, in that each channel element independently uses the same method to modify TPC commands in case of overload. The former method requires quite much signaling in the base station BS but could be handy if priorities are taken into account. However the different priorities can be incorporated into fast closed power control methods used in each channel element without any intervention of a base station control unit BCU. The proposed method mainly focuses on the use of a distributed method because of simplicity and much easier implementation.

The limitation of the maximum connection based DL transmission power of NRT-users in case of PtxTotal>PtxTarget could also be influenced. This could mean, for example, that if PtxTotal is above PtxTarget, the maximum transmission power of the connection is reduced by 5 dB.

H) ANNEX

All of the above mentioned powers used for load control, like e.g. PrxTotal, PrxTarget and PrxThreshold (for UL), are noise rises, i.e. wideband interference powers over system noise (power divided by system noise). This annex defines relationships between the used parameters.

Other to own cell interference ratio i:

$$i = \text{Prx\_oth}/\text{Prx\_own}$$

$$= (PrxTotal - \text{Prx\_own} - P\_N)/\text{Prx\_own}$$

Noise rise NR:

$$NR = PrxTotal/P\_N = ((1+i)\text{Prx\_own}/P\_N) + 1$$

$$= (1+i)\sum_{i=1}^{M}[PrxTotal/(P\_N*(1+(W/\rho_i R_i)))] + 1$$

$$= (1+i)Luplink*(PrxTotal/P\_N) + 1,$$

with M being the number of users, w being the bandwidth, ρ being Eb/N0, R representing the bit rate, Luplink representing the total uplink load factor of a sector and P_N being the system noise $$NR = PrxTotal/P\_N$$

$$= 1/[1-(1+i)\sum_{i=1}^{M}1/(1+(W/\rho_i R_i)) = 1/(1-\eta)$$

Fractional Load:

$$\eta = (1+i)\sum_{i=1}^{M}1/(1+(W/\rho_i R_i)) = 1-(1/NR) = (NR-1)/NR$$

Pure interference power over noise:

$$\text{Prx\_interference} = (PrxTotal - P\_N)/P\_N = (1/(1-\eta)) - 1$$

$$= \eta/(1-\eta)$$

The load control means of the radio network controller RNC uses an uplink power estimation means when deciding the bit rates of which connections and how much are to be reduced in order to overcome the overload situation.

Some reasonable values for PrxTarget would be 3.5 dB and for PrxThreshold 5 dB. The respective fractional loads are then 0.55 and 0.68. So when fractional load increases 22% from 0.55 to 0.68, the total interference level will increase 41% from 3.5 dB to 5 dB. This fact emphasizes the importance of the load control method. Simple conversion table between noise rise and fractional load and the derivative of noise rise with respect to fractional load are presented in the following table.

TABLE

Noise rise - fractional load mapping

| Noise rise | Fractional Load | d(noise rise)/d(fractional load |
|---|---|---|
| 0 dB | 0 | |
| 3 dB | 0.5 | 6 dB |
| 4 dB | 0.6 | 8 dB |
| 5 dB | 0.68 | 10 dB |
| 6 dB | 0.75 | 12 dB |
| 7 dB | 0.8 | 14 dB |
| 8 dB | 0.84 | 16 dB |
| 9 dB | 0.87 | 18 dB |
| 10 dB | 0.9 | 20 dB |
| 20 dB | 0.99 | 40 dB |

A way of calculating uplink power increase estimate is to use the derivative of noise rise with respect to fractional load as follows:

$$NR = \frac{P_{rx\_total}}{P_N} =$$

$$\frac{1}{1-(1+i)\sum_{i=1}^{M}\frac{1}{1+\frac{W}{\rho_i R_i}}} = \frac{1}{1-\eta} \Rightarrow \eta = \frac{NR-1}{NR} \Rightarrow \frac{dNR}{d\eta} = \frac{1}{(1-\eta)^2} =$$

$$\frac{1}{\left(1-\frac{NR-1}{NR}\right)^2} = NR^2 \Rightarrow \Delta P_{rx\_total} = \frac{dNR}{d\eta}\Delta L = NR^2 \Delta L$$

This is very much inline with old method, which was $$\Delta P_{rx\_total} = \frac{\Delta L}{1-\eta-\Delta L}NR = \frac{\Delta L}{1-\Delta L-\frac{NR-1}{NR}}NR = \frac{NR^2 \Delta L}{1-NR\Delta L} = NR^2\Delta L.$$

The present invention proposes a method for traffic load control in a telecommunication network consisting of at least one radio terminal and at least one radio transceiver device, each radio transceiver device defining a cell of said network being controlled by a network control device; comprising-the steps of setting a first reference load value for the load of a respective cell; monitoring the load of said respective cell, and in response to the load exceeding the first reference load value, manipulating the power control to decrease the transmission power levels in the cell. The present invention thus proposes a fast load control method in that during a situation in which a certain reference load value is exceeded, the load is controlled per base station sector by manipulating power control, e.g. transmit power commands. In addition, such load reductions can be supplemented by re-negotiating bit rates, for example. With the proposed method a necessary load margin can be reduced which advantageously increases the system capacity.

It should be understood that the above description and accompanying drawings are only intending to illustrate the present invention by way of example. Thus, the preferred embodiments of the invention may vary within the scope of the attached claims.

What is claimed is:

1. A method for traffic load control in a telecommunication network consisting of
    at least one radio terminal (MS) and
    at least one radio transceiver device (BS), each radio transceiver device (BS) defining a cell of said network being controlled by a network control device (RNC);
    at least one power control entity for controlling the transmission power used on connections;
    the method comprising the steps of:
        setting a first reference load value for the load of a respective cell;
        monitoring the load of said respective cell, and
        in response to the load exceeding the first reference load valve, manipulating the output of the power control entity to decrease the transmission power levels in the cell, wherein
        said monitoring is effected periodically, and
        a period for monitoring is shorter during the time when said monitored load indication parameter exceeds said first reference load value than otherwise.

2. A method according to claim 1, wherein
    the power control is manipulated by manipulating power control messages sent between the power control entities in the network and the radio terminal.

3. A method according to claim 1, wherein
    setting a second reference load value, which is greater or equal than the first reference load value.

4. A method according to claim 3, wherein
    in response to the load exceeding the second reference load value, in addition, negotiations to decrease the connection parameters such as the bit rate for at least one connection are started.

5. A telecommunication network control element (RNC), adapted to carry out the method according to claim 4.

6. A method according to claim 3, wherein
    in response to the load exceeding the second reference load value, in addition, procedures for removing at least one connection from the cell are started.

7. A method according to claim 6, wherein
    the connection is removed from the cell by handing it over to another cell.

8. A method according to claim 6, wherein
    the connection is removed from the cell by terminating the connection.

9. A method according to claim 1, wherein
    said traffic has a non-real time (NRT) traffic component and a real time (RT) traffic component.

10. A radio transceiver device (BS) of a telecommunication network, adapted to carry out the method according to claim 1.

* * * * *